United States Patent
Skogsrud et al.

(10) Patent No.: US 10,099,466 B2
(45) Date of Patent: Oct. 16, 2018

(54) MACHINE TOOL

(71) Applicants: Simen Svale Skogsrud, Oslo (NO); Thomas Boe-Wiegaard, Easton, CT (US); Even Westvang, Oslo (NO); Alexandre Chappel, Oslo (NO); Hans Fosker, Oslo (NO)

(72) Inventors: Simen Svale Skogsrud, Oslo (NO); Thomas Boe-Wiegaard, Easton, CT (US); Even Westvang, Oslo (NO); Alexandre Chappel, Oslo (NO); Hans Fosker, Oslo (NO)

(73) Assignee: Polarworks, AS, Oslo (NO)

( * ) Notice: Subject to any disclaimer, the term of this patent is extended or adjusted under 35 U.S.C. 154(b) by 0 days.

(21) Appl. No.: 15/822,011

(22) Filed: Nov. 24, 2017

(65) Prior Publication Data

US 2018/0117898 A1    May 3, 2018

Related U.S. Application Data

(63) Continuation of application No. 15/504,585, filed as application No. PCT/US2015/047109 on Aug. 27, 2015.

(Continued)

(51) Int. Cl.
*B33Y 50/02* (2015.01)
*B33Y 30/00* (2015.01)
(Continued)

(52) U.S. Cl.
CPC ............. *B33Y 50/02* (2014.12); *B25J 9/1679* (2013.01); *B29C 64/20* (2017.08);
(Continued)

(58) Field of Classification Search
CPC ... B29C 64/20; B29C 67/0085; B29C 64/245; B29C 67/0092; B29C 64/379; B29C 64/393; B29C 64/386; B29C 67/0088; B33Y 30/00; B33Y 50/02; G05B 2219/49023; G05B 19/4099; B25J 9/1679
See application file for complete search history.

(56) References Cited

U.S. PATENT DOCUMENTS

| | | | |
|---|---|---|---|
| 5,811,951 A | * | 9/1998 | Young ..................... B25J 9/042 318/568.1 |
| 6,027,326 A | * | 2/2000 | Cesarano, III .......... B28B 1/001 264/113 |

(Continued)

*Primary Examiner* — Robert J Grun
*Assistant Examiner* — Jerzi H Moreno Hernandez
(74) *Attorney, Agent, or Firm* — Kim Rubin Patent Agent

(57) ABSTRACT

A machine tool incorporating two angular axes as an inverted SCARA arm and a vertical, linear Z-axis, is described. A build surface on which a 3D object may be additively built is rotated around a lambda axis and also revolved around a theta axis. Embodiments are described that: (i) are free of belts, pulleys, cables and other soft drive mechanisms; (ii) place all three axis motors below a base plate; (iii) direct drive the build surface from shafts of a lambda and theta motor; (iv) are free of a rectangular box frame; (v) use angle sensors mounted directly on motor drive shafts; (vi) measure and compensate for build surface skew; (vii) incorporate a single element for both Z-axis support and a bearing surface. Both device and method embodiments are claimed.

22 Claims, 7 Drawing Sheets

Related U.S. Application Data

(60) Provisional application No. 62/043,293, filed on Aug. 28, 2014.

(51) Int. Cl.
    *B33Y 10/00*       (2015.01)
    *B29C 64/20*       (2017.01)
    *G05B 19/4099*     (2006.01)
    *B25J 9/16*        (2006.01)
    *B29C 67/00*       (2017.01)
    *B29C 64/386*      (2017.01)
    *B29C 64/245*      (2017.01)

(52) U.S. Cl.
    CPC .......... *B29C 67/0088* (2013.01); *B33Y 10/00* (2014.12); *B33Y 30/00* (2014.12); *G05B 19/4099* (2013.01); *B29C 64/245* (2017.08); *B29C 64/386* (2017.08); *G05B 2219/49023* (2013.01)

(56) References Cited

U.S. PATENT DOCUMENTS

| | | | |
|---|---|---|---|
| 8,778,252 B2 * | 7/2014 | MacKie | B29C 67/0055 264/308 |
| 9,205,600 B1 * | 12/2015 | Kerr | B29C 64/20 |
| 2006/0147188 A1 * | 7/2006 | Weng | F16M 11/046 396/5 |
| 2013/0015596 A1 * | 1/2013 | Mozeika | B25J 9/0084 264/40.1 |
| 2013/0189435 A1 * | 7/2013 | Mackie | B29C 67/0055 427/256 |
| 2014/0134333 A1 | 5/2014 | Hedges | |
| 2014/0197576 A1 * | 7/2014 | Kraibuhler | B29C 67/0059 264/308 |
| 2014/0271964 A1 * | 9/2014 | Roberts, IV | B29C 67/0088 425/150 |
| 2015/0110912 A1 * | 4/2015 | Okamura | B33Y 30/00 425/162 |
| 2015/0147424 A1 * | 5/2015 | Bibas | B29C 67/0088 425/150 |
| 2015/0239178 A1 * | 8/2015 | Armstrong | B33Y 30/00 700/98 |
| 2015/0251360 A1 * | 9/2015 | Steele | B33Y 10/00 264/308 |
| 2015/0298393 A1 * | 10/2015 | Suarez | B33Y 70/00 425/3 |
| 2016/0185047 A1 * | 6/2016 | Windau | B29C 67/0088 358/406 |
| 2017/0217100 A1 * | 8/2017 | Gardiner | B29C 67/0088 |

* cited by examiner

MACHINE TOOL

This application is a continuation application from parent application Ser. No. 15/504,585, filed Feb. 16, 2017, a National phase application claiming priority to PCT application PCT/US15/47109, in turn claiming priority to U.S. Provisional Application No. 62/043,293 filed Aug. 28, 2014, all of which are incorporated herein by reference.

No new matter has been added.

TECHNICAL FIELD

The field of the invention is manufacturing tools using three or more axes to manufacture a three dimensional object. Embodiments include additive manufacturing machines. The invention incorporates an inverted SCARA arm driving a platform on which an object is manufactured.

BACKGROUND OF INVENTION

A 3D printer is a device, and method of using the device, to create a three-dimensional object from an electronic file that defines the shape of the object. 3D printers may be additive or subtractive in that they build up the object on a platform or build plate by adding material, or create the object by subtracting material. Most 3D printers are additive. Most milling machine and lathe operations are subtractive, for comparison. A typical additive 3D printer uses a head, also called an extruder or print head, which deposits small amounts of material at a time. The material may be liquefied in the head by heat, placed on the object being built, which then hardens as it cools. An alternative system uses a material that is hardened or polymerized by the use of light, UV light, other radiation or heat. Another alternative system uses a tank of liquid or gel, which is hardened point-by-point or piece-wise by the head.

A core unit of material in the object, or the definition of that unit in a source file, is often referred to as "voxel," which corresponds roughly to volumetric pixel. A 3D source file may include vector or face definitions, rather than, or in supplement to, voxels. A 3D printer may convert some or all of a 3D source file to voxels, or it may convert the source data to a series of vectors, which are typically in a plane.

The prior art of 3D printers are based on an X-Y-Z, 3-axis, Cartesian, orthogonal grid. The X-Y axes usually define a horizontal plane, with the Z-axis being vertical. The object is formed in one X-Y plane at a time, with the Z-axis incrementing continually in steps. For each Z-axis increment, an X-Y plane is printed. The head in the X-Y plane may move in a repetitive scanning pattern, or in a series of vector motions, or both.

A characteristic of this design is that it requires three motors, effectively one for each of the X-Y-Z axes, not including a filament drive motor in the print head. The 3D printer is typically constructed in a box frame (a six-sided or five-sided frame enclosing the mechanisms and build surface), with each motion controlled by at least one screw drive or belt, and the build plate or its support moving on two orthogonal pairs of parallel slides. Alternatively, the head may move on the two orthogonal pairs of parallel slides with the platter fixed X-Y and moving vertically in the Z-axis. Thus, a typical design requires a box frame, 3 motors, 3 or more screws or belts, and four to six slides. Maintaining true orthogonality of the axes is a challenge. For some implementations, maintaining accuracy and linearity on one or more axes is also a challenge.

Prior art includes Fuse Deposit Modeling, or FDM™; FDM™ is a trademark of Stratasys, Inc. Prior art includes fused filament fabrication (FFF) and Plastic Jet Printing (PJP).

Prior art includes SCARA (Selective Compliance Robot Arm) arms, inverted SCARA arms, and robotic SCARA arms.

Embodiments of this invention include subtractive as well as additive manufacturing machines.

SUMMARY OF INVENTION

This invention overcomes weaknesses in the prior art.

The invention uses "angular" coordinates in place of Cartesian X-Y coordinates for the horizontal plane.

The two axes in the horizontal plane are rotation of a turntable about its center axis (the lambda axis), and rotation of the turntable around a portion of a swing axis away from the center of the turntable (the theta axis). The Z-axis is a traditional vertical axis. In one embodiment a vertical screw within a vertical column drives the head or extruder block comprising a material nozzle on the Z-axis. In one embodiment a Z-axis drive screw or linear motor drives a horizontal beam; the beam comprises an extruder head; one or more nozzles in the extruder head generate the material used to additively build an object by the device.

One embodiment uses software to translate from the X-Y linear coordinate system in the source file to lambda and theta angular values. In this embodiment, the source data may be viewed as voxels (points, lines, edges, curves, faces, surfaces, textures or volumes defined at least in part by one or more voxels) consisting of X, Y, and Z scalar coordinates; while the corresponding voxel data for the embodiment consists of lambda, theta and Z scalar coordinates. The range of the source X, Y, and Z coordinates are generally within the physical range of the machine, (unless some post-coordinate scaling or clipping is performed); while the range of the lambda and theta coordinates are necessarily within the range of [0°, 360°), although a machine may have a smaller range of these two coordinates. In one embodiment, the range of lambda is [0°, 360°) and the range of theta is smaller than [0°, 360°). Note that secondary factors regarding voxels, such as tolerances, velocity and acceleration may be similarly converted from an X-Y-Z coordinate system to the lambda-theta-Z coordinate system. We refer to all such coordinate conversions simply as, "coordinate translation." In some embodiments there is no translation from the source Z coordinate to the target Z coordinate. In other embodiments, such as using skew correction discussed below, there is also coordinate translation from the source Z scalar to the target Z scalar.

One embodiment measures the non-orthogonality between the plane of the turntable (or build surface) and the embodiment's effective mechanical Z-axis. This measurement identifies an error that may be referred to as skew. Note that since skew is the offset of the turntable or platter plane from perfect orthogonally from the Z-axis, at least two scalars are required to define skew. This embodiment uses this measurement to offset at least one of the three coordinates: lambda, theta, and Z. Skew correction may be computationally performed at the same time as other coordinate translation, or separately before (i.e., in the X-Y-Z space) or after (i.e., in the lambda-theta-Z space).

In another embodiment, the software treats the volumes, or voxels, near the lambda axis as a special case. In particular, the speed of the lambda axis may be limited in or near these locations.

In yet another embodiment, the software treats the volumes, or voxels, at the lambda axis as a special case. In particular, the turntable may be rotated 180°.

In yet another embodiment, the invention (all three axes) is free of combinations of belts, cables, pulleys, and chains, including being free of all of these.

In yet another embodiment, the turntable is connected directly to the lambda motor shaft such that the rotational angle of the turntable is the same as the rotational angle of the lambda motor shaft. This embodiment is free of gears or other parts that move relative to each other between the lambda motor shaft and the turntable.

In yet another embodiment, the lambda motor is connected directly to the theta motor shaft via a rigid arm such that the rotational angle of the rigid arm is the same as the rotational angle of the theta motor shaft. This embodiment is free of gears or other parts that move relative to each other between the theta motor shaft and the lambda motor.

In yet another embodiment, the invention comprises a single screw, or threaded rod, used to drive the Z-axis.

In yet another embodiment, the extruder head is fixed directly or indirectly to the Z-axis drive, free of both X and Y drive mechanisms.

In yet another embodiment the extruder head is free of all mechanical drives, between the base of the printer and the extruder head, other than the Z-axis and the filament drive.

In yet another embodiment, the invention is free of a box frame. That is, free of a rectangular (or equivalent, such as cylindrical) frame that provides required mechanical support for any of the three motion axes.

In yet another embodiment, the invention comprises only a single, structural, fixed vertical component: the Z-axis rail.

In yet another embodiment, the head is a component of a single horizontal beam supported at one end, with that end being attached to the Z-axis drive column.

In yet another embodiment, the invention is free of any components to compensate for non-perfect alignment of one or more lead screws or drive screws.

In yet another embodiment, the invention comprises an angular opening between the build surface and the extruder head, around the center of the turntable, platter or build surface that is at least 350°, or 330°, or 300°, or 270° or 220°, or 180°, or 150°, or 120°. This angular opening is free of all elements of the embodiment; in particular, free of frame elements. Such an opening permits free access to the part being built. In particular, monolithic parts that are larger, in both the X-Y planes, than the sides of a volume that encloses the embodiment, may be constructed in steps.

In yet another embodiment, coordinate translation is performed in real time, during operation of the 3D printer.

In yet another embodiment, the turntable, platter or build plate is removable without tools. In yet another embodiment, the turntable is, or supports, the platter. This specification and the claims refer to a "build surface." This is the reference surface on which a part is built, and is typically the zero reference point for Z-axis measurements. Typically, the build surface is the upper surface, either real or virtual, of a platter, build plate or build surface. It is useful to think of this surface as a reference plane or in a reference plane, rather than a physical part such as a removable platter. Note that in various embodiments there may or may not be various layers between the moving turntable and the part being built. One such later may be a removable, but permanent platter. Another such layer may be a single-use "tablecloth" that may be provided by a user, placed underneath the part. It may be necessary to think of the build surface as a physical object, such as a platter driven by a turntable. Thus, a platter may be construed to mean a build surface, and vice versa. Other names for the platter are "build surface" or "build plate." In yet another embodiment the turntable or platter may be removed, replaced, or added with an automated mechanism. In one embodiment the platter is secured to the turntable, either vertically, horizontally, or both, with magnets. Three magnets, six magnets, or magnet pairs may be used. In one embodiment the turntable or platter is effectively secured in the horizontal plane with alignment pins, posts, recesses mating detents, screws, clips, other fasteners, and the like, and is held in place by gravity.

A working surface for a part is often called a build plate in the prior art because it does not move. In our embodiments the build plate moves: being driven by a turntable. Thus the term "platter" is more descriptive, although a build plate and a platter serve the same function, and may be construed, when appropriate, as the same or equivalent part and function.

DESCRIPTION OF EMBODIMENTS

All embodiments shown and discussed are exemplary only and non-limiting. As those trained in the art know, there are many alternative materials, configurations, structures and method steps that implement the claimed invention.

Note that the term, "rotate" describes a physical or virtual object rotating around an axis internal to the object. For example, an audio record revolves around the spindle on a common (if dated) record player. Rotation is physically implemented with rotary motion.

Whereas, the word "revolve" describes a physical or virtual object moving in an arc, without necessary rotation, around an axis that may not be within the object. For example, consider a person standing and holding a mechanical compass; the compass needle rotates around a pin (to indicate magnetic north) while, if the person moves his feet on a vertical axis to face in a different direction, the compass body revolves around vertical axis of the person. In this example, we may consider the axis of the person to be the theta axis and the axis of the compass needle to be the lambda axis.

Figure 1:
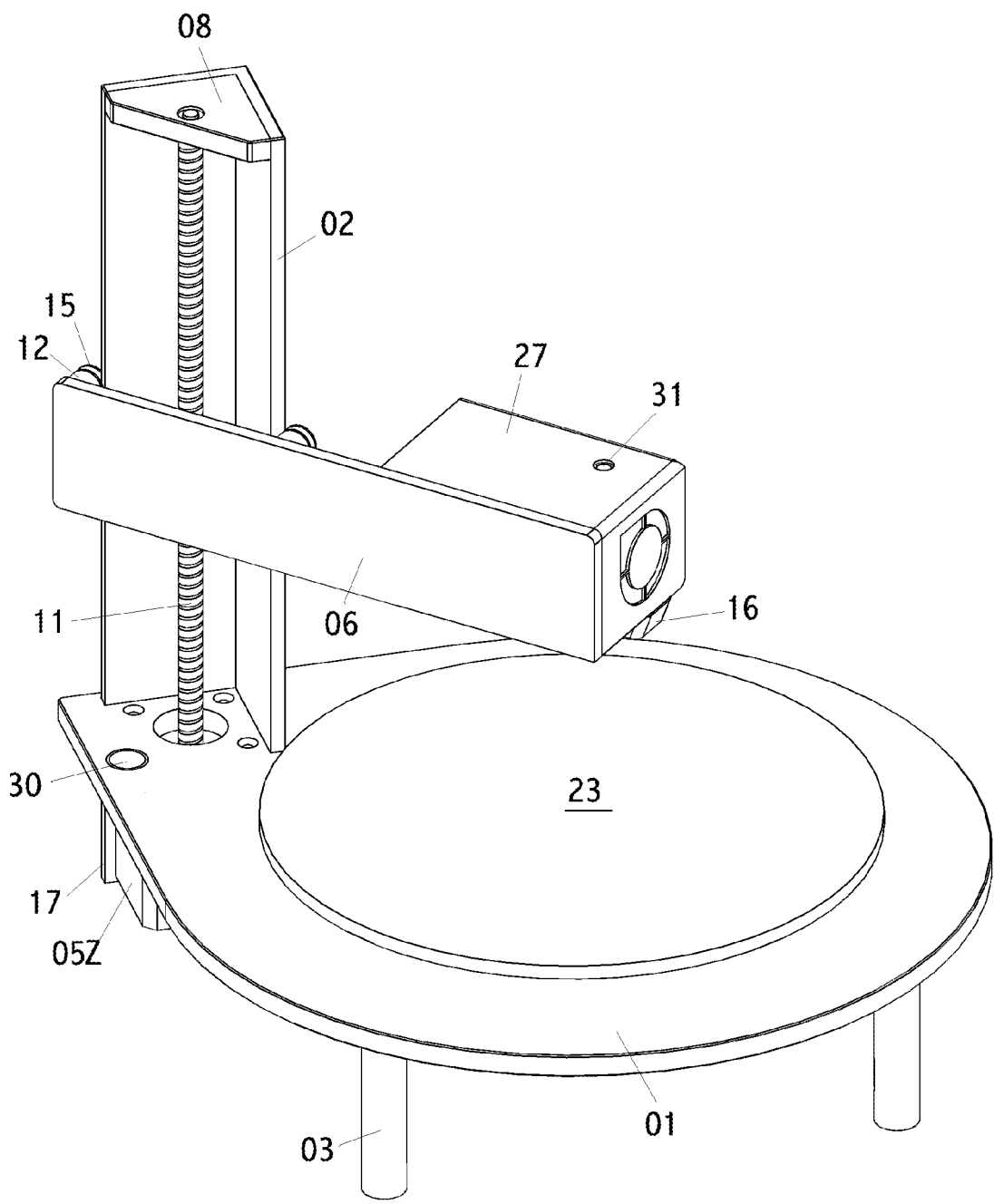
FIG. 1 shows a perspective view of one embodiment of the 3D printer.

FIG. 1 shows a perspective view of one embodiment. Horizontal base plate 01 is a primary structural element. The base plate 01 is supported by three legs 03, which mate with three leg footers, not shown, to support the device on a bench, desk, floor or other support surface. In one embodiment, the base plate 01 is also supported by the Z rail footer 17. The vertical Z rail 02 is a second primary structural element. The Z rail 02 encloses on two sides the Z-axis threaded rod 11, which in turn drives the boom 06 up and down on the Z rail 02, via a lead screw nut, not shown. The boom 06 rides on the Z rail 02 via four bearings 12 with spacers 15.

Mounted on or in the boom 06 are an extruder 16 and an enclosure cover 27 for a portion of the extruder, filament drive motor, and fan (also called a fan cover, or enclosure). The extruder 16 is mounted on the boom behind an extruder plate, not shown, and the enclosure cover 27. A Z rail top plate 08 mounts at the top of the Z rail 02 and secures the top of the Z-axis threaded rod 11 with a bearing, shown but not numbered. The Z-axis threaded rod 11 is driven by the Z-axis motor, 05Z. The Z rail 02 is terminated at the bottom with the Z rail footer 17. The extruder block 16 includes as least one nozzle that dispenses an additive material. Some embodiments use multiple extruders or extruders with multiple nozzles. Typically, the extruder block and nozzle are fed from a filament, which is heated in the extruder or in the nozzle. The nozzle is not visible in this Figure. A hole 31 is provided, through which an additive material filament, not shown, is fed. Not shown is a filament drive motor, also identified as the "fourth motor." A power switch, 30, is shown. The turntable is shown as 23. A platter or build surface, not shown, may be on top of the turntable 23. An enclosure for the extruder, filament drive motor, and fan is shown as 27.

Figure 2:
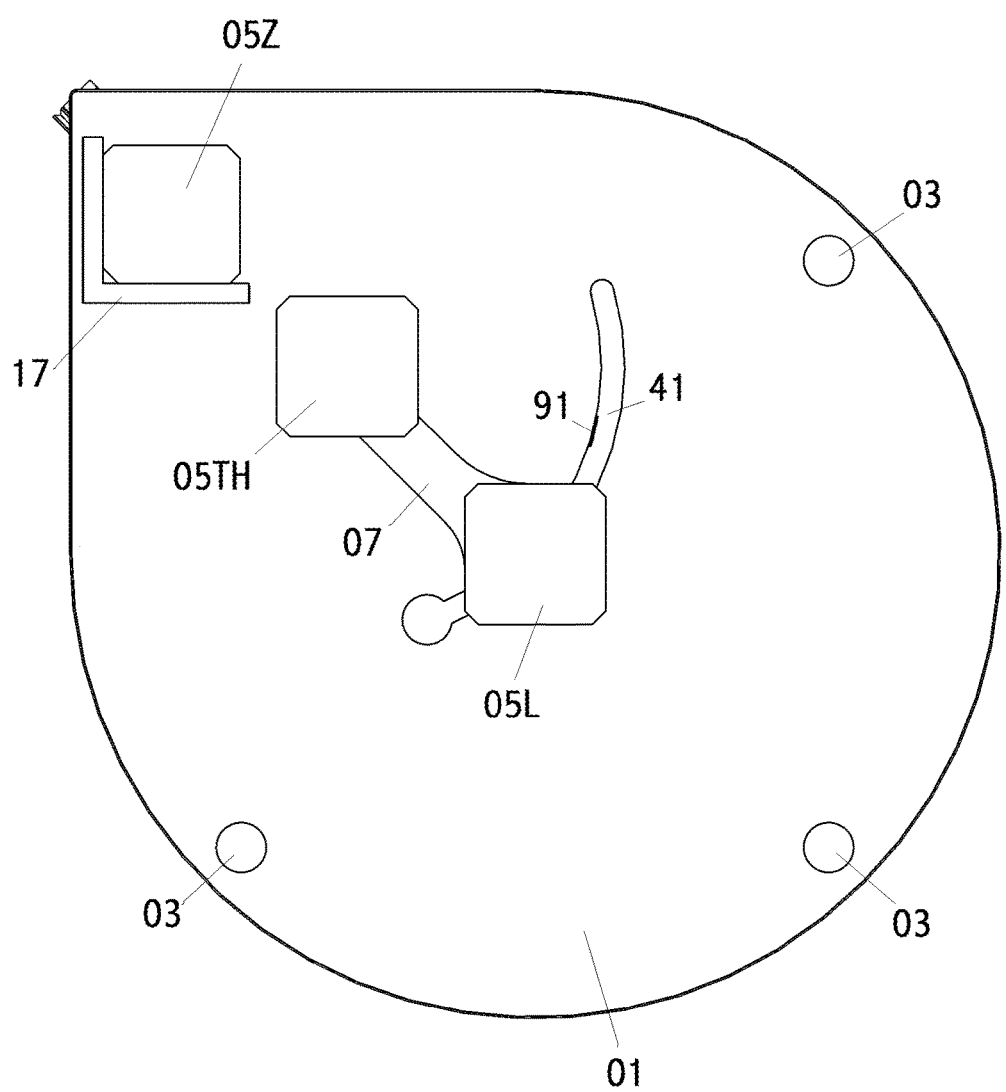
FIG. 2 shows a bottom view of one embodiment of the 3D printer, showing the three motor locations.

FIG. 2 shows an exemplary bottom view. Duplicate reference designators from other Figures refer to the same component. The base plate 01 is shown. Three motors are visible: a Z-axis motor 05Z, adjacent to a Z-rail footer 17; a lambda motor 05L, which rotates the turntable, not shown, around the lambda axis, which is the center of the lambda motor shaft, not shown; and a theta motor 05TH, which move the arm 07 in an arc around the theta axis, which is the center of theta motor shaft, not shown. The lambda axis revolves around the theta axis. All three motors are mounted with spacers, not shown. See FIG. 6 for a schematic view of the relationship between the lambda and theta motors, and theta motion. The lambda motor 05L is attached to the turntable, not shown. The lambda motor and the turntable are on opposing sides of the base plate 01. There is a penetration in the form of a curved slot, 41, in the base plate, through which the lambda motor connects to the turntable. A shaft grabber, not shown, connects the shaft of the Z-axis motor 05Z to the threaded rod, shown as 11 in FIG. 1. The 3D printer is supported on three legs, 03. One embodiment uses NEMA Standard motor size "NEMA 17" for one or more of the four motors in the printer. Motors may be stepper motors or servomotors, or another type of motor (such as PZT or hydraulic motors). We discuss primarily stepper motors in this document.

A novel embodiment implements motion damping for the theta movement, the lambda movement, or both, by taking advantage of the slot 41 shown in FIG. 2. Damping for the theta axis may be accomplished by the use of a friction liner, spacer, or component on the inside of slot 41 that makes contact with the base plate penetration from motor 05L to the turntable. Damping for the lambda axis may be accomplished by the use of a damping element comprising one or more friction sleeves, bushings, brushes, pressure plates, fittings or components around (fully or partially) the rotating lambda shaft of motor 05L (or an extension thereto), wherein the damping element which makes contact with that shaft. In one novel embodiment, a single component, which may be monolithic, constructed from two monolithic components, or not monolithic, provides damping for both the lambda and theta motions. For example, a press-fit liner may be placed in the slot which provides friction and damping both as the lambda motor shaft moves long the length of the shaft (theta motion) and also provides friction and damping as the lambda motor shaft rotates (lambda motion). Another novel embodiment uses a sleeve or bushing to implement at least part of motion damping for both the lambda and theta motions. For example, this sleeve around the rotating lambda motor shaft provides damping for the lambda motion on the inside of the sleeve, and damping for the theta motion on the outside of the sleeve, as the sleeve moves along the length of the slot, 41. By altering the pressure, surface size, surface type, and any optional lubricant or friction fluid (such as wax) differently for the inside and the outside of the sleeve, and the surfaces of the lambda motor shaft and the inside of the slot, the damping for the lambda and theta motions may be controlled, at least to an extent, independently. In one embodiment both a slot lining and a shaft sleeve are used. In one embodiment the sleeve is at least partially round on the inside and shaped to match a portion of the slot on the outside. In such an embodiment, the combined damping element may be monolithic.

In one embodiment the one or more damping elements described above are field replaceable without the use of tools. Such replacement may be for maintenance. In another embodiment, different damping elements may be field interchangeable to achieve intentionally different damping factors.

Suitable materials for the damping elements include composites, felt, hard rubber and plastics, such as polyethylene, Teflon, PTFE, Nylon or other fluoropolymers or semi-aromatic polyamides. Specifically claimed are a monolithic damping element for the lambda motion; a monolithic damping element for the theta motion; and a monolithic damping element for both the lambda motion and theta motion with a single element. Specifically claimed are damping configurations that use the slot 41 in the base plate 01 as part of the damping element or function. Specifically claimed are damping elements and configurations as described for use in a SCARA arm. Specifically claimed are damping elements and configurations as described for use in an inverted SCARA arm. Specifically claimed are damping elements and configurations as described for use in an inverted SCARA arm in a 3D printer.

In some embodiments, the printer dynamically measures one or more damping parameters, of the above described damping elements, and then incorporates the one or more measured damping parameters into the processing of source move commands into motor control outputs. One way to measure the damping is to drive the lambda or theta axes at maximum velocity, and then instantly freeze the drive waveforms to a fixed value, effectively dropping the drive velocity to zero. Shaft position encoders provide the actual rotational positions of the motor shafts, and thus the turntable rotational positions by virtue of the stiffness and lack of backlash between the motor shafts and the turntable. The time and rotational distance traveled may then be used to compute the effective damping, for that real time configuration of the machine and any part on the build surface. In addition, resonant frequencies for both lambda and theta axes may be measured, similarly, including more than one resonant frequency on either or both axes. Knowledge of resonant frequencies may be used, for example, to reduce velocity or acceleration when motion would be at or near a resonant frequency. Such measurement(s) and use(s) may be claimed.

Dynamic damping measurement not only compensates for machine variations, such as temperature, age and wear, but also may compensate for variations in the weight of a piece being built. Thus, not only may damping vary as a part is being constructed, but also the varying damping may be measured once or more during part construction and used to alter, improve or compensate for the processing of source move commands into motor control outputs, during part construction.

Damping is generally viewed as part of a spring-mass-damping system. Typically, it is ideal to have critical damping in systems, although slight under-damping, with respect to desired part tolerance, may permit higher speed operation. In some embodiments, it is difficult to separate spring-mass-damping parameters separately for the theta and lambda axes. Thus, a single damping element that effectively damps the entire system may be the simplest implementation of damping and be suitable for applications. The use of a single damping element to damp two axes, in particular the axes of these embodiments, may be novel and so claimed. However, in other embodiments spring-mass-damping parameters may be determined separately for the theta axis and the lambda axis, either dynamically for one machine, or statically in advance of operation, including determination by modeling, theoretical calculations, or both. For example, only the theta motor may be moved and the theta motor shaft position sensor used to observe and then compute spring-mass-damping for this axis. This movement and measurement is then repeated similarly by moving only the lambda motor. If the build surface is empty, both the mass and springiness of the machine elements are then accurately measured and thus known. Thus, wear or intentionally created other variations of damping parameters may be measured by these elements and these methods. Note that acceleration or velocities, during this measurement or calibration, may be higher, even considerably higher, than the maximum acceleration or velocities used during operation. Note that due to the stiffness of the machine design, an object on the build surface may contribute the bulk of springiness of operational spring-mass-damping. Therefore, dynamic measurements of spring-mass-damping are desirable. Since the mass of the components in the machine is known in advance, and the mass of the object being constructed is easy to compute at any progress point during the build, and damping parameters may also be known in advance of the start of a build, it is possible to measure and then compute the springiness of an object being built during building, and then use this measurement to alter motor outputs. In particular, lower acceleration or lower peak velocities may be used, or longer dwell time, in order to permit mechanical settling to improve final object build accuracy. Such dynamic measurements, computations and use may be novel and may be so claimed. Note also that springiness and damping parameters of the spring-mass-damping system may vary substantially between rotational movement and linear movement, and may vary substantially from one linear movement to an orthogonal liner movement. For example, consider the construction of a tall, thin wall. The object, when moved in the direction of the wall axis, is stiff; while movement perpendicular to the wall axis is springy. Therefore, in some embodiments, it is desirable to measure parameters of the spring-mass-damping systems separately for some or all of these axes and to combine both known (in advance of a build) and real-time measurements of spring-mass-damping parameters, in particular, springiness. Having shaft position sensors on the motor shafts provides the ability to dynamically measure damping during object construction on a 3D printer, and this is a novel benefit of this design embodiment. Damping embodiments, including combinations discussed in this paragraph, are explicitly claimed. One embodiment of a damping, friction element is shown as 91 in FIG. 2.

Figure 3:
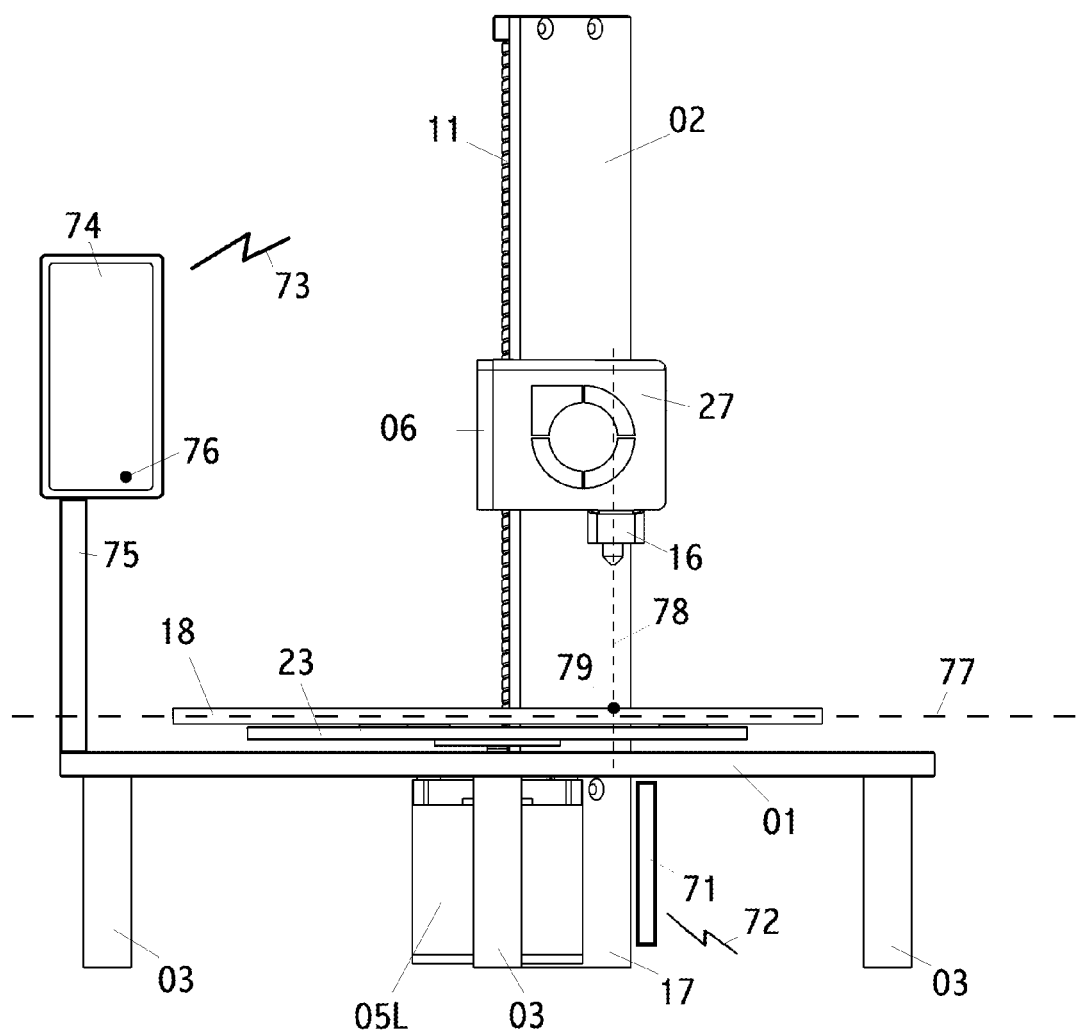
FIG. 3 shows a front view of one embodiment of the 3D printer, showing the Z rail, base plate, turntable and platter.

FIG. 3 shows an exemplary front view. Duplicate reference designators from other Figures refer to the same component. The base plate is shown 01. One motor, the lambda motor 05L, is visible. Three legs 03 are shown. The Z-rail footer 17 is shown. The Z-rail 02 is shown. The Z-axis threaded rod 11 is shown. An end view of the boom 06 is shown. An enclosure cover 27 for a portion of the extruder, filament drive motor, and fan, is shown. 16 shows the extruder, partially visible below the enclosure cover 27. In this Figure, the print head, or extruder nozzle, is visible as the lowest portion of the extruder. The turntable 23 is visible with a platter or build surface 18 resting on top. The drive shaft, not numbered, of the lambda motor 05L is just visible, penetrating the base plate 01 and connecting at the bottom center of the turntable 23. This drive shaft penetrates through the base plate 01 through a curved slot, shown as 41 in FIG. 2.

Figure 7:
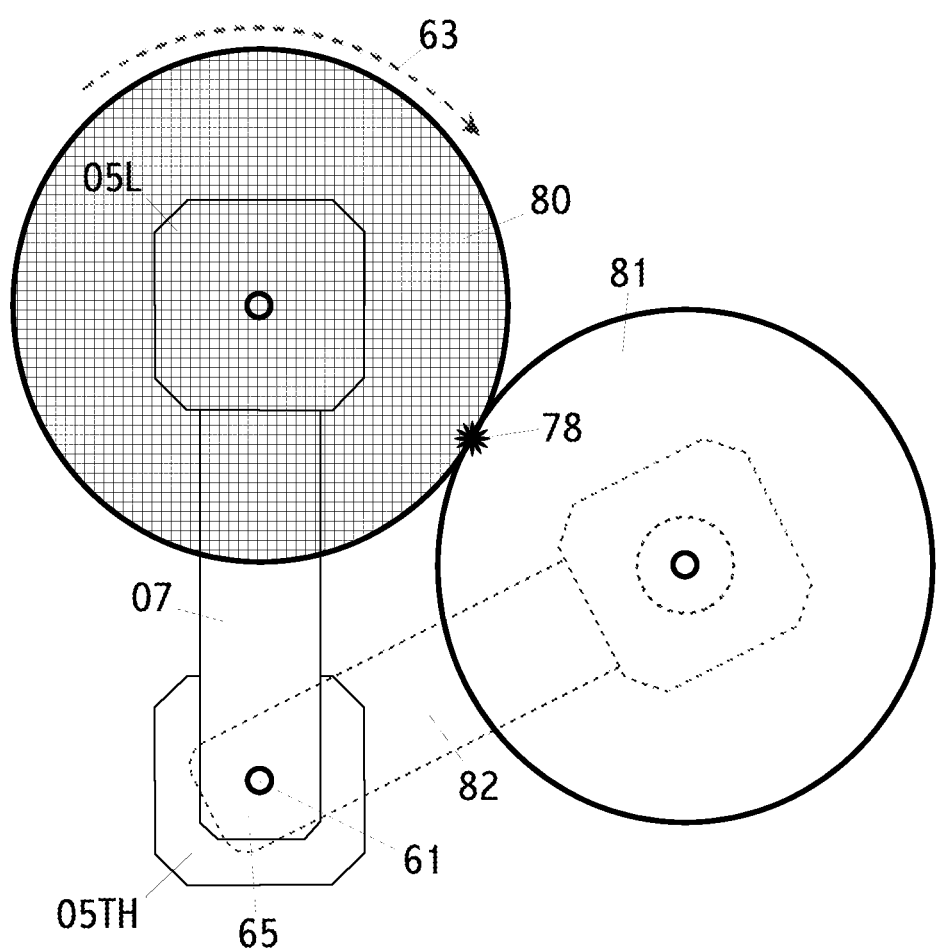
FIG. 7 shows an exemplary build area.
to U.S. Provisional Application No. 62/043,293 filed Aug. 28, 2014.

Continuing with FIG. 3, a machine tool controller is shown as 71, with a wireless interface 72. A personal electronics device 74, may comprise a camera 76, a wireless interface 73 and a mount 75 to a fixed portion of the device, such as base plate 01. 77 shows an imaginary plane, the reference plane, that is parallel to the base plate 01 and the turntable 23. 78 shows an imaginary tool head axis passing through the tool head 16 and normal to the reference plane 77. 79 is an intersection point of the tool head axis and the build surface 18. The tool head axis 78 is also shown in FIG. 7.

Figure 4:
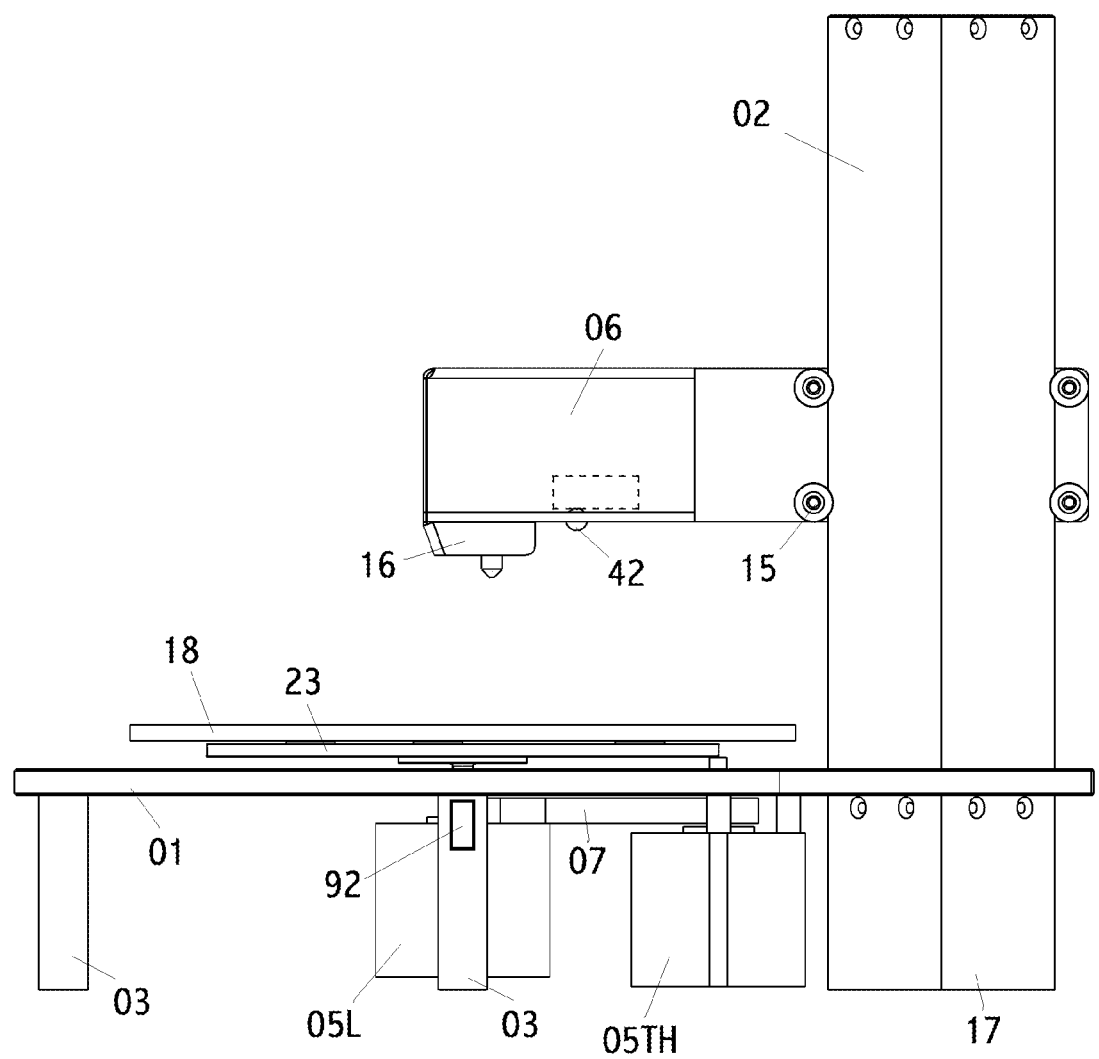
FIG. 4 shows a side view of one embodiment of the 3D printer, showing the boom, Z rail, legs, and two motors.

FIG. 4 shows an exemplary side view. Duplicate reference designators from other Figures refer to the same component. The base plate is shown 01. Two of the three legs 03 are visible. Alternative embodiments use four legs, which may include leg levelers. The lambda motor 05L and the theta motor 05TH are shown. The arm 07 is shown. The Z-rail footer 17 and the Z-rail 02 are shown. The boom 06 is shown. The extruder 16 with the print head, also called the nozzle, is visible. The boom 06 rides on the Z-rail 02 via four bearings 15. The turntable 23 is visible, with a platter or build surface 18 on top. FIG. 4 also shows a schematic view of a micro-switch or other sensor 42, used to measure turntable or platter skew, as described elsewhere. Note that in practice it is necessary that the extruder 16 and its print head do not interfere with the micro-switch function, and vice-versa. The extruder is lower than the micro-switch, for example, in the range of 0.5 to 10 mm lower. Interference is avoided by having the build surface move outside of the print area. The Z-axis move distance for this action is such that the extruder nozzle misses the build plate or build surface 23, thereby allowing the micro-switch to make contact with the build surface. The vertical distance between the micro-switch and the extruder nozzle is known and that offset is applied to the micro-switch readings during the machine calibration process. The theta motor may be used to rotate the turntable for this purpose. Hysteresis in the sensor may be cancelled by using only one or both state changes of the sensor. Sensors other than a micro-switch may be used to measure or determine turntable, platter or build surface skew, such as magnetic or inductive sensors, Hall-effect sensors, optical or acoustic sensors, or vision-based sensors. Reflective or interference patterns may be used as part of turntable or platter distance determination, including turntable, platter or build surface skew. Skew is ideally measured at three places, equally spaced, near the perimeter. However, either fewer or more measurement locations may be used. Note that in some embodiments it may be advantages to measure skew directly on the build surface, while in other embodiments it may be advantageous to measure skew directly on the turntable. More than three measurements may be used to more accurately compute build surface skew, or may be used to measure warp, or both. FIG. 4 also shows an embodiment of a damping, friction element, 92.

Some embodiments may include automatic level detection, or automatic level adjustment (or instructions to a user how to adjust), or both.

The fourth motor, the filament driver motor, drives the filament through the extruder head and the nozzle. The rate at which this motor drives the filament is the primary way that the device sets a material feed rate, for a given filament size and structure. Note that depositing voxels at a desired rate (e.g., voxels per second) also requires adjusting the effective speed of the platter at the nozzle head. The voxel deposition rate is proportional to the material feed rate divided by the instantaneous linear speed of the platter under the nozzle.

A circuit board, not shown in Figures, comprises the electronics to run the device. Firmware or software, or both, is located on this board. In some embodiments, a boot loader on the circuit board downloads software via a cable or wireless connection, not shown. The circuit board may be located under the base plate 01, or in another location. A portion of the electronics or software to run the device may not be located on the device. For example, a portion of the software to run the device may be located in a PC, server, mobile electronic device, or the like, and communicate with the device over a wired or wireless connection, not shown.

A power button assembly may comprise an LED power button ring, a cover, and a power button shown as 30 in FIG. 1. In some embodiments the "power button" has additional or other uses besides turning power on and off. For example, it may be used to change from a standby state to an active state, or vice-versa; it may be used initiate a reset, cold-start, warm-start, software update, calibration cycles, stop building, pause, or other operations. Such multiple operations may be accomplished by holding the button down for a predetermined time, or by pushing it a predetermined number of times, or both. An alternative name for the power button is control button.

Figure 5:
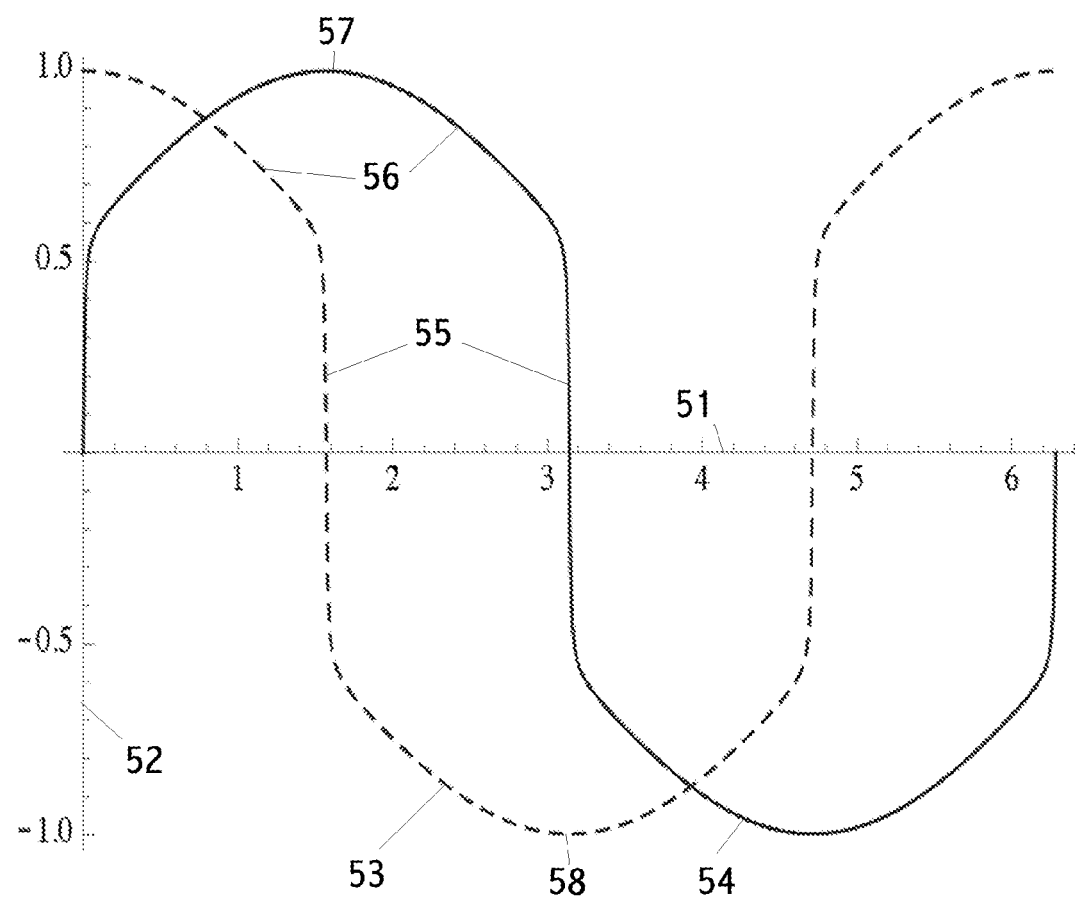
FIG. 5 shows an embodiment of drive waveforms for a stepper motor.

FIG. 5 shows an embodiment of an improved, and claimed, waveform to drive a stepping motor. As those in the art know, stepping motor waveforms were originally square waves, and then those were improved with "micro stepping" using staircase waveforms. Micro-stepping provided more angular motor positions than achievable by the basic step size of the motor. For example, a motor with 400 basic steps (0.9° per step) might have eight times this many angular locations, or 3200 micro-steps, if an 8-level staircase waveform is used for drive. An improvement over micro-stepping is a sine-wave drive, where two sine wave signals, each representing the nominal current through a coil, operate 90° out of phase to achieve steady rotational velocity. Although angular resolution of the motor is now limited to the accuracy of the sine wave, inherent non-linearity and other factors in both the design and fabrication of the motor limit accuracy such that the accuracy limitation is typically larger than the resolution limitation.

A claimed embodiment provides an improvement over sine wave drive. A modified pair of sine wave drive signals, such as shown in FIG. 5, provide improved linearity, improved accuracy, improved repeatability, and improved holding torque over sine wave drive.

Linearity is defined as the graphical relationship between a desired angle and the actual angle, typically for angles covering 360° of a drive signal—that is, four full basic motor steps. Accuracy is defined as the error between one desired angle and the actual angle.

In FIG. 5, the horizontal axis 51 is marked in arbitrary angular rotation units. The vertical axis 52 shows motor coil current, normalized so that 1.0 is peak current. The solid black line 54 shows the current in one coil; the dotted line 53 shows the current in the second coil. Point 57 shows peak positive current in the first coil; Point 58 shows peak negative current in the second coil. Note that at these two peaks, 57 and 58, the current in the other coil is zero. In one embodiment, mixing together a square wave signal with a sine wave signal creates the idealized waveform. Another embodiment additionally uses a "smoothed" square wave in the mix. Details are described below. One goal and effect is to minimize "small currents" into coils, as these have minimal beneficial effect on linearity, accuracy, or holding torque. Thus, current values above 0.5 are preferred, shown as time locations 53, 54 and 56 of the coil currents, while lower values of current that would exist in a sine wave drive are set to or near zero, shown as points 55. The parameters that create the exact shape may be determined theoretically from the motor design or practically via testing a particular motor in a particular configuration.

The improved sine wave drive is described in detail, below.

Figure 6:
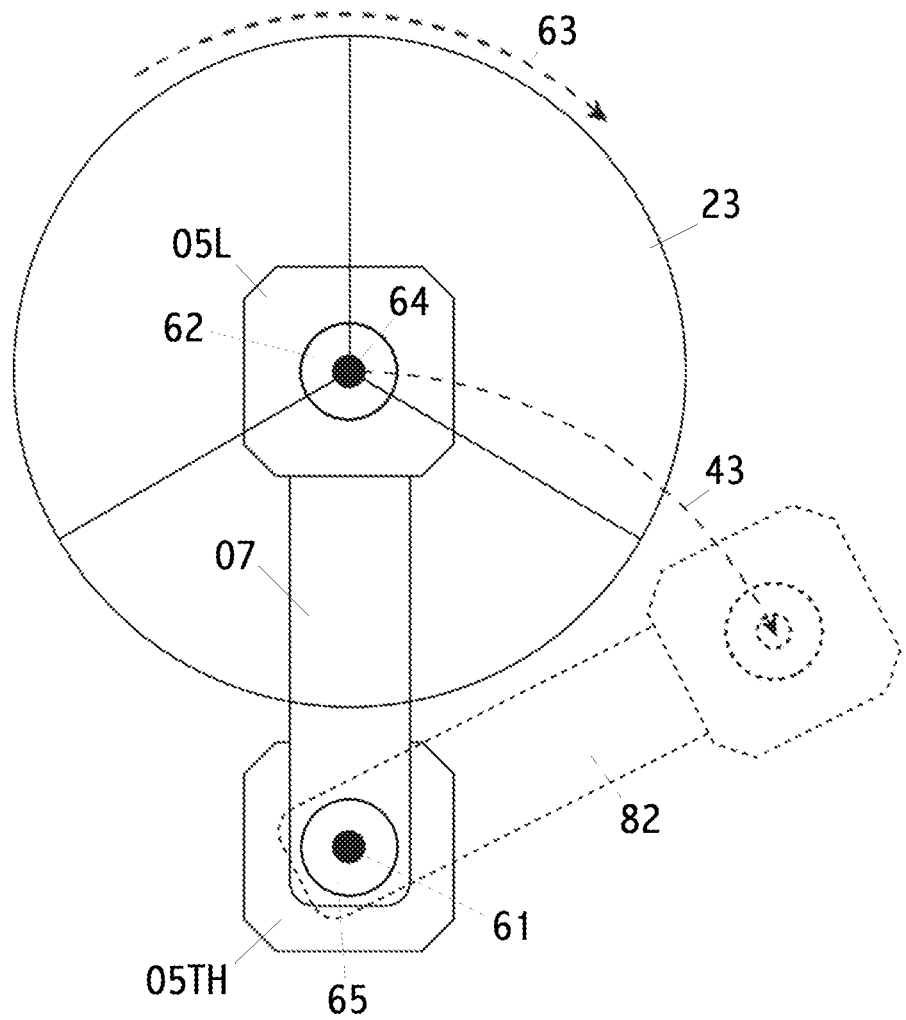
FIG. 6 shows an exemplary view of two positions of the theta arm.

FIG. 6 shows two positions of the arm 07, the theta motor, 05TH, the lambda motor, 05L, turntable 23, previously described. 61 is a theta motor shaft, rotated by the theta motor, 05TH. 64 is a lambda motor shaft, rotated by the lambda motor, 05L. 65 and 62 are a rotational angle sensors that measure the rotational angle of the theta and lambda motor shafts, respectively. 63 shows one direction of rotation of the turntable 23 around the lambda shaft 64. 43 shows one direction of rotation of the arm 07 around the theta motor shaft, 61. 61 shown both the theta motor shaft and the associated imaginary theta axis, which typically runs through the center of the motor shaft. Similarly, 64 shows both the lambda motor shaft and the associated imaginary lambda axis, which typically runs through the center of the motor shaft. The rotational motion of the arm 07 may be limited to an arc, as shown by two exemplary positions of the arm, 07 and the dotted-line rotation of the arm, 82; rotation of the arm from position 07 to position 82 is shown by arrow 43. Rotational angle of arm may be limited as shown by 07, 82 and 43; and by a slot shown as 41 in FIG. 2.

FIG. 7 shows elements in FIG. 6 where reference designators are the same. 80 and 81 show two positions of a build surface, which may be smaller than the turntable, 23 in FIG. 6. A top view of a tool head axis 78 is also shown in FIG. 3. The combination of rotational motions of the theta motor and lambda motor cause any desired point on the build surface, shown as hatching in 80, to be in line with the tool head, 16 in FIG. 3. That is, all points on the hatched build surface 80 may be reached by a functional fixed position tool head 16 using only the theta and lambda motors for motion.

Step-Less Stepping Motor Driving

Let the current across each coil of a two pole stepping motor be represented by curves such as two ideal sine waves, 90° out of phase. As the phase goes from 0 to 360°, four complete basic motor steps are produced. Driving the stepper directly through this phase-curve instead of traditional stepping we achieve a kind of super-granular resolution. Any intermediate value between the full-step values is valid and the resolution of the stepper circuit is only limited by the accuracy with which we are able to control the currents (using PWM, for example), and knowledge of the nonlinearities of the given motor.

A sinusoidal drive might work for an ideal motor, but such a motor does not actually exist. Based on experimentation we have arrived at a phase curve shape that will drive most stepping motors very smoothly at low speeds given two adjustable parameters: "sinusness" and "smoothness." Generating this curve, such as that shown in FIG. 5, is the concern of the function mo_set_phase, as shown in the code below:

```
// Moves the twister arm/platter assembly to track
// position of the simulated gantry robot
static void maintain_xy_motion(float x_, float y_) {
   static float distance, x, y;
   uint8_t stage = motion_tick % TWISTER_MAINTENANCE_STAGES;
   switch (stage) {
      case 0: x = x_; y = y_; break;
      case 1: distance = sqrt(x*x+y*y); break;
      case 2: theta =
         2*asin(distance/(2*ARM_LENGTH)) +theta_offset; break;
      case 3: lambda = theta/2-acos(y/distance)*signof(x);
         break;
      case 4: set_motor_position(MOTOR_THETA, theta,
         THETA_STEPS_PER_REVOLUTION); break;
      case 5: set_motor_position(MOTOR_LAMBDA, lambda,
         LAMBDA_STEPS_PER_REVOLUTION); break;
   }
}
float square_sin(float x, float smoothness) {
   return (2*atan(sin(x)/smoothness))/M_PI;
}
float square_cos(float x, float smoothness) {
   return square_sin(x+(M_PI/2), smoothness);
}
void mo_set_phase(uint8_t motor, float radians, float rate,
float modulator) {
   float _s, _c;
   uint8_t base_coil = motor*2;
   float sinusness = sinusness_table[motor]; // i.e. 0.41
   float smoothness = smoothness_table[motor]; // i.e. 0.008
   _s = sin(radians)*sinusness+square_sin(radians,
      smoothness)*(1.0-sinusness);
   _c = cos(radians)*sinusness+square_cos(radians,
      smoothness)*(1.0-sinusness);
   set_coil(base_coil, _s);
   set_coil(base_coil+1, _c);
}
``` square_sin generates a continuous derivable square-like wave with the same phase properties as a sinus curve and with adjustable edge smoothness. A smoothness of 1.0 yields an actual sine wave, while the function approaches an actual square wave as smoothness asymptotically approaches 0.

In our implementation in this embodiment the square wave has the role of "skipping" through the "dead zone" where the current in each coil is so low that little to no torque is applied. The smoothness of the wave is used to avoid introducing noise or shaking into the system as the curve transitions from one polarity to the next.

Next, this square wave is mixed with a certain amount of traditional sine wave. The sinusness parameter specifies the proportions of the mix. As sinusness approaches 1.0 the square-like wave is replaced with a sine wave. The sinusness and smoothness values are determined experimentally for each motor in the assembly. Our current setup uses motors that run well with a sinusness of 0.41 and a square wave smoothness of 0.008. Revisiting our phase-diagram, our functions now look like FIG. 5. See the code below for one embodiment:

```
// These curves are then fed to our PWM-driver like this:
// There are four coils, two for each motor. Current is signed.
static void set_coil(uint8_t coil, float current) {
   uint8_t base_channel = coil*2;
   if (current > 0.0) {
      set_pwm(base_channel, current);
      set_pwm(base_channel+1, 0);
   } else {
      set_pwm(base_channel, 0);
      set_pwm(base_channel+1, -current);
   }
}
// The pulse length that will yield full duty cycle
#define PWM_MAX 750
// There are 16 channels, four for each motor. Saturation is
// unsigned.
static void set_pwm(uint8_t channel, float saturation) {
   if (saturation < 0) { saturation = 0; }
   else if (saturation > 1.0) { saturation = 1.0; }
   uint32_t dutycycle = floor(PWM_MAX*saturation);
   switch(channel) {
      // PWM hardware registers for the STM32 ARM processor
      case 0 : TIM3->CCR1 = dutycycle; break;
      case 1 : TIM3->CCR2 = dutycycle; break;
      case 2 : TIM3->CCR3 = dutycycle; break;
      case 3 : TIM3->CCR4 = dutycycle; break;
      case 4 : TIM5->CCR1 = dutycycle; break;
      case 5 : TIM5->CCR2 = dutycycle; break;
      case 6 : TIM5->CCR3 = dutycycle; break;
      case 7 : TIM5->CCR4 = dutycycle; break;
      case 8 : TIM1->CCR1 = dutycycle; break;
      case 9 : TIM1->CCR2 = dutycycle; break;
      case 10: TIM1->CCR3 = dutycycle; break;
      case 11: TIM1->CCR4 = dutycycle; break;
      case 12: TIM4->CCR1 = dutycycle; break;
      case 13: TIM4->CCR2 = dutycycle; break;
      case 14: TIM4->CCR3 = dutycycle; break;
      case 15: TIM4->CCR4 = dutycycle; break;
   }
}
```

Driving the stepping motors this way yields the ability of near continuous step-resolution and noiseless operation at very low speeds. Low noise is novel benefit of stepper-motor equipment designed for use in home, lab or office environments.

Details of Coordinate Translation

Twister is the name of one particular embodiment of software that performs coordinate translation, also called coordinate.

Twister works by running a simulated "shadow" Cartesian robot in X-Y-Z-space, then mimicking the motions of the Cartesian robot in the angular coordinate space of the present printer mechanism. We call the space of the embodiment the theta, lambda, Z space where theta describes the rotation angle of the inner (arm) motor while lambda describes the revolution of the outer (turntable) motor. The Z-axis of the embodiment is a conventional linear axis actuated via a lead screw.

The Cartesian shadow-robot software is essentially a slightly modified version of the ubiquitous Grbl CNC firmware that can be found here: http://github.com/grbl/grbl.

Grbl works by executing a small kernel MOTION_TICK-S_PER_SECOND times per second. A typical rate would be 30 kHz, however ranges from 1 kHz to 300 kHz may be used. Typically, such rates depend at least partially on machine size. Twister piggybacks on this kernel executing the function maintain_xy_motion for every time-step. It is the task of this function to keep the theta-lambda assembly in sync with the X-Y position of the shadow robot. Sample code is shown below:

```
// Update the position of the arm/platter assembly
maintain_xy_motion(
    (1.0f*st.position[X_AXIS])/PLANNER_
        STEPS_PER_MM,
    (1.0f*st.position[Y_AXIS])/PLANNER_
        STEPS_PER_MM);
```

The conversion to floating-point division by PLANNER_STEPS_PER_MM has the effect of converting the shadow coordinates in stepper-motor-step-counts to a floating-point millimeter position.

The transfer function code from X-Y-coordinates to theta-lambda is shown in the code below:

```
d(x, y)=sqrt(x*x+y*y)
theta(x, y)=2*arcsine(d(x, y)/(2*ARM_LENGTH))
lambda(x, y)=theta(x, y)/2-arccosine(y/d(x,
    y))*signof(x);
```

Where the d function yields the magnitude of the [x, y]-vector (i.e. the distance from the center of the platter to the tip of the tool in the X-Y-plane), ARM_LENGTH is the length of the arm (in the same unit of scale as x and y). Signof yields 1.0 for all values>0, −1 for all values less than 0, and 0.0 for exactly the value 0.0.

Maintain_xy_motion takes this transfer function and for performance reasons, it multiplexes the calculations across time steps completing one small unit of calculation for every motion tick. Every sixth completion of the cycle in this function updates the theta-lambda motor states completely. This is shown in the code, below:

```
//Moves the twister arm/platter assembly to track the
position of
// the simulated gantry robot
static void maintain_xy_motion(float x_, float y_) {
    static float distance, x, y;
    uint8_t stage = motion_tick % TWISTER_MAINTENANCE_STAGES;
    switch (stage) {
        case 0: x = x_; y = y_; break;
        case 1: distance = sqrt(x*x+y*y); break;
        case 2: theta =
            2*asin(distance/(2*ARM_LENGTH))+theta_offset; break;
        case 3: lambda = theta/2-acos(y/distance)*signof(x);
            break;
        case 4: set_motor_position(MOTOR_THETA, theta,
            THETA_STEPS_PER_REVOLUTION); break;
        case 5: set_motor_position(MOTOR_LAMBDA, lambda,
            LAMBDA_STEPS_PER_REVOLUTION); break;
    }
}
```

Where motion_tick is a counter that increments for every iteration of the motion-kernel at the rate of MOTION_TICKS_PER_SECOND. Input parameters x_ and y_ give the desired position of the tool relative to the center of the platter and must be in the same unit of length as the constant ARM_LENGTH. TWISTER_MAINTENANCE_STAGES equals 6, but may be set higher to reduce the processor load by effectively reducing the update frequency of the assembly. THETA_STEPS_PER_REVOLUTION and LAMBDA_STEPS_PER_REVOLUTION is the steps-per-revolution for the respective motor in the machine. In the current prototype these values are both 400 because we are using motors with 0.9 degrees per step. Set motor position is called with the identifier of a target stepper motor, the desired current angle of this motor and the number of steps per revolution of this motor. This function is very simple, effectively just calling mo_set_phase for the given motor with the angle converted to a phase angle for the magnetic field in the given stepper motor. This is shown in the code below:

```
static void set_motor_position(
    uint8_t motor,
    float angle,
    uint16_t steps_per_revolution) {
    mo_set_phase(motor, angle*(steps_per_revolution/4), 0, 0);
}
```

The "phase" of a motor refers to the angle of the magnetic field in the motor coils. The angle parameter above refers to the angle of a complete rotation of the motor. The expression above converts angle to a phase value for that specific angle of the motor. As long as the motor is driven relatively slow and it never looses a full step, this will always keep the motor at the actual provided angle in this function call.

Platter Tilt, or Skew Compensation

The text below describes one embodiment of measuring and correcting for turntable or platter skew.

First the position of the theta motor is established by running it clockwise until the arm trips a micro-switch or other sensor placed at the outer extreme of the arm swing area. The theta motor is retracted slowly and its angular position is zeroed when the micro-switch disengages.

The lambda motor does not need to be homed, because the orientation of the platter is arbitrary when the print starts, so the position of the lambda motor is summarily zeroed at the start of the homing cycle.

A second micro-switch is placed under the Z-axis boom such that it may be lowered and raised to probe the height of the turntable, platter or build surface perimeter at different points. The platter shaft slot is shaped so that the platter may be moved slightly out of the way of the tool. There is also an opening in the base plate that allows the tool, or extruder head, to sink below the base plate when the platter is moved aside in this fashion. This allows the micro-switch on the boom to contact the perimeter of the platter.

The measurements are taken by lowering the boom until the switch closes, then lifting the boom slowly and noting the Z-position at which the micro-switch changes switch state. In a current implementation of the homing cycle this measurement is performed three times at equal intervals along the perimeter (every 120 degrees). Sensors other than a micro-switch, operating with equivalent functionality, may be used accomplish the same task with equivalent motions.

Calculating the Tilt-Plane

The homing cycle yields measurements at three points along the perimeter of the platter or build surface. For increased accuracy in some embodiments additional measurements are taken until a consistent plane for the build surface is established. The measurements are used to calculate the tilt plane of the platter or build surface. The angles provided to the function are the angles along the platter or build surface with respect to the tool position when lambda=0.0. The Z values may be in mm units. The radius is the distance from center to the measurement point, which are incidentally equal for all measurements because of the way the measurements are taken in one embodiment. The function init_wobble_corrector takes these parameters and sets up the constants for a plane equation as shown in the code below:

```
void init_wobble_corrector (float radius,
    float angle0, float z0,
    float angle1, float z1,
    float angle2, float z2) {
    // Calculate the Cartesian points for the samples
    float p1[ ] = {cos(angle0)*radius, sin(angle0)*radius, z0};
    float p2[ ] = {cos(angle1)*radius, sin(angle1)*radius, z1};
    float p3[ ] = {cos(angle2)*radius, sin(angle2)*radius, z2};
```

```
// Convert to two vectors by subtracting one
float v1[ ] = {p2[0]-p1[0], p2[1]-p1[1], p2[2]-p1[2]};
float v2[ ] = {p3[0]-p1[0], p3[1]-p1[1], p3[2]-p1[2]};
// Find the cross product of the vectors found in Step 1.
plane_a = v1[1] * v2[2] - v1[2] * v2[1];
plane_b = v1[2] * v2[0] - v1[0] * v2[2];
plane_c = v1[0] * v2[1] - v1[1] * v2[0];
// The coefficients a, b, and c of the planar equation are
//    i.e. 30, -48, and 17.
// So we have 30x - 48y + 17z = d.
// To find d, we simply plug one of the three points into
//    the equation.
// For example, if we select the point (1,2,3), we get
// (30)(1) - (48)(2) + (17)(3) = -15
plane_d = plane_a*p1[0]+plane_b*p1[1]+plane_c*p1[2];
}
```

Applying the Compensation

Using the data in some embodiments set up a transformation matrix to correctly rotate and transform the Cartesian coordinates of the ghost gantry robot to compensate for the tilt of the platter or build surface, which would then compensate for all three axes, but observing that the tilt is usually less than half a degree, it has proved sufficient in this embodiment to just skew the build surface (here, the platter top) by adding a displacement value to any Z-coordinate as it is accepted from the Gcode. To find the value to add to any given Z-coordinate at any given [x, y]-point one uses the planar equation as shown in the code below:

```
float act_wobble_correct_zero_z_at(float x, float y) {
    return (plane_d-plane_a*x-plane_b*y)/plane_c;
}
```

This function yields the Z-location of the platter or build surface under the tool (e.g. nozzle or extruder head) at the specific [x, y]-coordinate. This displacement is added to the Z-coordinates as they are accepted into the motion plan of the simulated gantry robot from the G-code-parser, as shown in the code below:

```
// Add a new linear movement to the motion plan.
void plan_buffer_line(float x, float y, float z, float e,
float feed_rate, uint8_t invert_feed_rate)
{
    // Prepare to set up new block
    block_t *block = &block_buffer[block_buffer_head];
    // Apply wobble correction for off axis platter
    z += act_wobble_correct_zero_z_at(x, y);
    [...]
}
```

Dealing with the Possibility of Near Infinite Rotation Speeds

Implementing a controller for an exotic, or angular, robot geometry by transforming the output of a motion control system created for another geometry in real time is, in the context of one embodiment, a cost effective way to achieve an effective implementation, in particular, with respect to performance and cost. The results in most cases are in practice equivalent of what a native motion control algorithm would yield; however, there is one trouble spot:

When the shadow gantry robot moves close to the pivot point of the platter, it does not know that its output may require the platter to rotate at speeds approaching infinity. One simple fix for this problem is to implement a kind of "time dilation" where a subsystem monitors the actual speeds of the real robot and adjusts the time base of the simulated Cartesian robot to ensure that the velocities stay within the realm of the physically possible—especially avoiding impractical speeds.

Such measurements, computations and adjustments to operation may be novel and may be claimed.

The speeds are measured by monitoring the rate of change in the theta and lambda angle variables in the motion controller at regular intervals (such as 1 kHz, or in the range of 200 Hz to 20 kHz), as shown in the code below:

```
static void measure_theta_lambda_rates( ) {
    float elapsed = 1.0f*(motion_tick -
    rate_sampled_at_tick)/MOTION_TICKS_PER_SECOND;
    theta_rate = (theta-theta_sample)/elapsed;
    lambda_rate = (lambda-lambda_sample)/elapsed;
    theta_sample = theta;
    lambda_sample = lambda;
    rate_sampled_at_tick = motion_tick;
}
```

The time_warp factor is maintained with a certain hysteresis as shown in the code below:

```
// Calculates the fraction of max speed currently held by
// the most rapidly moving subsystem.
// 1.0 means the system is running at exactly the maximum
//    allowed rate. Used to control time warp braking.
static float fraction_of_max_physical_speed( ) {
    return
    fabs(lambda_rate)/MAX_LAMBDA_RATE_RADIANS_PER_SECOND;
}
// Bends time to keep actual physical motion within the
//    specified boundaries of the machine.
static void maintain_time_warp( ) {
    float max_speed_fraction =
    fraction_of_max_physical_speed( );
    float max_time_warp = 1/max_speed_fraction;
    // If speed already more than allowed, just hard-brake
    if (time_warp > max_time_warp) {
        time_warp = max_time_warp;
    }
    // When speed within 20% of max speed, start braking.
    if (max_speed_fraction > 0.80) {
        time_warp *= 0.99;
    } else if (max_speed_fraction < 0.9) {
        time_warp *= 1.01;
    }
    if (time_warp > 1.0) {
        time warp = 1.0;
    }
}
```

The specifics of how the gantry robot control software is modified to allow time_warp_ing may be immaterial to this document, suffice it to say that the time_warp modifies the step generation rate proportionally such that a time_warp of 0.5 runs the shadow bot at a speed half of real time.

A very special case must be handled separately. When a movement passes through the exact center of the platter, some of the mathematics in the control software breaks down. The required speed according to its equations would be exactly infinity. At this point the shadow bot must be stopped completely for a spell while the platter is rotated 180 degrees at maximum rate. This is handled as a special case as a special case in the software.

3D source file formats include STL (stereo lithography file format), Collada, ASE, S3D, U3D, DWF, DXF, 3DS, OBJ and STL. Source file format may pass through "slicer" software, which may be a component of an embodiment, or not, to produce a file containing a sequence of G-codes or Gcodes. The file containing the Gcodes may be a source file. ISO 6983 is often considered the most appropriate Standard for G-code Definitions "3D machine tool"—includes three axes within a 4D, 5D or 5D machine tool.

"Build area"—refers to horizontal area on which an object may be printed, typically on the platter or build surface, for a 3D additive printer.

"Controlled axis"—refers to an axis that is controllable to desired position, either a linear position or a rotary position, including a controlled velocity between positions, and excludes a continuous rotational axis, even if the rotational speed is variable, for example, a drill press or lathe rotational axis. The controllable desired position resolution should be comparable to the accuracy of desired feature size on a work piece on the machine.

"Drive screw compensating device"—a device or sensor designed to compensate for imperfections in a drive screw or its implementation, such as a drive screw backlash compensator. Such a compensating device may be mechanical, electronic, or software.

"Mechanical components of the first motion"—All mechanical components that move with the first motion.

"Open on an arc"—refers to the device being free of obstructions, such as frame element or other element, in the horizontal plane, from the lambda axis, in a circular arc, from any height of an object being printed or that might be printed.

"Part is affixed"—there are many ways a part may be affixed to a build area or tool range area. It may be affixed only by gravity. For an additive 3D printer, the stickiness of the additive material is sufficient to affix that portion, and the rest of the part as it is built. Note that in many cases an intermediate surface may be used, as one does not generally want to print directly on a portion of the machine, such as a turntable or platform. If platforms are cheap or disposable, or it is easy to remove a part completely from a platform, then the platform may be the intermediate surface. For subtractive manufacturing, clamps, vices, or other devices may be used.

"Part surface"—refers to surface on which a part is placed or secured, for either additive or subtractive machining.

"Planer tool area"—this is the area on the build surface, platter, turntable, build plate or other intermediate surface with defines the area in which the tool head is able to position, relative to the surface. This may be smaller than a platform, as it is helpful that the platform extends past every portion of a possible part.

"Platter, build plate or build surface"—generally refers to an actual element or virtual surface connected to the turntable (including attached by gravity) or an intermediate element between the turntable and the part. The part may be built directly on the build surface, or on another intermediate element. The build surface may comprise a "planer tool area." Note that in some contexts or embodiments usage of these terms may be slightly different. For example, if discussing dimensions of part, the base of the part will be in contact with a build surface or an intermediate layer between the build surface and the actual part. Similarly, calibration and skew measurement or correction may be for a specific element or surface. Generally, the platter is touching and driven by the turntable. Thus, the order of elements from top to bottom may be: part, intermediate layer on the build surface, build surface, platter, turntable, turntable drive elements (e.g., the drive motor shaft). Not all such listed elements are used in all embodiments. The one or more intermediate layers may be part of the embodiment or provided by a user; the one or more intermediate layers may be permanent, semi-permanent, or single-use. Equivalent structures or elements operating equivalently may be used and are included in the scope of the claims, even if such equivalent structures or element provide additional benefit.

"Real Time"—actions or measurements that occur during execution. For mechanical systems, and control and measurements thereof, real-time is during relevant motion of the mechanical system, as compared to computations in advance or during a simulation, or predetermined parameters.

"Tool range area"—the area on or over a part surface that is available for machining, either additive or subtractive. For part surfaces that are not horizontal, or on which the machining volume is below the part surface, the meaning of the term, "over" is adjusted accordingly.

"Turntable"—generally refers to the mechanical component that is connected to and driven by the lambda and theta motion systems. On top of the turntable may be removably placed a platter or build plate. The top surface of the build plate may be the build surface or comprise a planer tool area on which a part is fabricated; and it is this surface that is generally the reference surface for part and machine measurements. The build plate and build surface may alternatively be integral with the turntable.

Ideal, Ideally, Optimum and Preferred—Use of the words, "ideal," "ideally," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," and "feature," when used in the context of describing this invention, refer specifically to various embodiments of this invention. Examples, explanations and figures using the words "shown" or "code" refer to non-limiting embodiments. All figures are non-limiting embodiments. All descriptions herein are non-limiting, as one trained in the art will appreciate.

Claims of this invention explicitly include all combinations and sub-combinations of all features, elements, examples, claims, embodiments, tables, values, ranges, and drawings in the specification, drawings, claims and abstract. Claims of this invention explicitly include devices and systems to implement any combination of all methods described in the claims, specification and drawings. Claims of this invention explicitly include methods using devices and systems described in the claims, specification and drawings, in any combination.

Embodiments include a method of manufacturing a part using a 3D printer as described in the claims. Embodiments include a method of scanning a part using a 3D printer as described in the claims. Embodiments include a method of driving stepper motors in a machine tool as described in the claims. Embodiments include a method of damping lambda and theta rotational axes as described in the claims.

We claim:

1. A machine tool comprising:
 a lambda rotary motor comprising a lambda shaft and an associated lambda axis collinear with the lambda shaft;
 a theta rotary motor comprising a theta shaft and an associated theta axis collinear with the theta shaft;
 a build surface at a predetermined distance from a fixed reference plane;

a baseplate comprising an opening through which the lambda shaft passes;

a machine tool head having a tool head axis;

a connection arm affixed at a proximal end to the theta shaft and affixed at a distal end to the lambda motor;

wherein the lambda and theta axes are parallel and offset;

wherein the reference plane is normal to the lambda and theta axes;

wherein the reference plane is at a predetermined distance from the baseplate;

wherein the lambda motor is disposed on a first side of the base plate and the build surface is disposed on a second side of the base plate;

wherein the build surface is adapted to accept a removably affixed part;

wherein the tool head axis passes through the machine tool head, is normal to the reference plane and is fixed relative to the theta axis;

wherein the lambda shaft is configured to rotate the build surface around the lambda axis;

wherein rotation of the theta shaft is configured to revolve the lambda motor, the lambda axis, and the build surface in an arc around the theta axis; and wherein the rotations of the lambda and theta shafts are configured to move the build surface such that any desired point on the build surface is intersected by the tool head axis.

2. The machine tool of claim 1 wherein:
the build surface moves responsively to only rotations of the lambda and theta shafts.

3. The machine tool of claim 1 wherein:
the movable mechanical portions of the machine tool consisting of: the lambda motor, theta motor, lambda shaft, connecting arm, build surface, and all intervening movable mechanical elements are free of belts, pulleys, chains, wires, gears, screw drives and hydraulics.

4. The machine tool of claim 1 wherein:
rotation of the lambda shaft causes the build surface to revolve; wherein a rotational angle of the build surface relative to the lambda axis is the same as a rotational angle of the lambda shaft around the lambda axis; and rotation of the theta shaft causes the build surface to revolve; wherein the rotational angle of the build surface relative to the theta axis is the same as a rotational angle of the theta shaft around the theta axis.

5. The machine tool of claim 1 further comprising:
a machine tool controller, adapted to accept part source data;

a lambda rotational angle sensor disposed on the lambda shaft, operatively connected electronically to the machine tool controller;

a theta rotational angle sensor disposed on the theta shaft, operatively connected electronically to the machine tool controller;

wherein the machine tool controller is configured to provide motor control outputs to the lambda and theta motors responsive to the part source data, the lambda rotational angle sensor, and the theta rotational angle sensor.

6. The machine tool of claim 1 further comprising:
a single lead screw axis, passing through the center of a single lead screw and through the center of a shaft of a Z-axis rotary motor; wherein the Z-axis rotary motor is configured to drive the lead screw directly; and wherein the lead screw axis is parallel to and offset from the tool head axis;

a Z-axis rail, comprising two sides parallel to the lead screw axis, wherein the two sides are joined at a common edge; and a tool head boom; wherein the tool head boom comprises Z-axis bearings;

wherein the Z-axis bearings ride operatively on edges of the Z-axis rail; and wherein the Z-axis rotary motor is configured to move the tool head boom on a linear path parallel to the Z-axis.

7. The machine tool of claim 6 wherein:
the two sides of the Z-axis rail partially enclose the lead screw.

8. The machine tool of claim 6 wherein:
the lead screw passes through the base plate.

9. The machine tool of claim 6 wherein:
the sole support for the boom is the lead screw and Z-axis rail.

10. The machine tool of claim 6 wherein:
the Z-axis rotary motor is mounted on a first side of the base plate and the boom is disposed on a second, opposing side of the base plate; and wherein the machine tool is free of any lead screw error-compensating element.

11. The machine tool of claim 6 further comprising:
a single build surface skew sensor, disposed on the boom, offset from the tool head axis, configured to measure an angle between the build surface and the reference plane;

wherein the machine tool is free of a second sensor configured to measure an angle between the build surface and the reference plane.

12. The machine tool of claim 11 wherein:
the single build surface skew sensor, for a fixed position of the boom, is disposed at a distance from the build surface larger than the distance of the machine tool head from the build surface; wherein distances are measured normal to the reference plane.

13. The machine tool of claim 6 wherein:
the machine tool is free of a box frame enclosing a group of: the lambda motor, the theta motor, the build surface, the Z-axis motor, the Z-axis rail, the boom, and the tool head; and wherein the machine tool is free of a box frame providing mechanical support for any member of the group.

14. The machine tool of claim 6 wherein:
the baseplate opening is a curved slot disposed at predetermined fixed radial distance from the theta axis.

15. The machine tool of claim 12 wherein:
the machine tool comprises a controller configured to:
(a) move the build surface to a first position;
(b) lower the boom until the skew sensor detects the build surface;
(c) raise the boom;
(d) move the build surface to a second position;
(e) lower the boom until the skew sensor detects the build surface; and
(f) compute two scalar values for build surface skew responsive to steps (a) through (e).

16. The machine tool of claim 1 wherein:
with the exception of the machine tool head, the machine tool is free of any additional mechanical actuator other than the lambda rotary motor, the theta rotary motor, and a Z-axis motor.

17. The machine tool of claim 6 wherein:
the lambda rotary motor, the theta rotary motor, and the Z-axis rotary motor are disposed on the first side of the base plate.

18. The machine tool of claim 1 wherein:
a rotary motion of the lambda shaft and a rotary motion of theta shaft are communicated to the build surface via the lambda shaft.

19. The machine tool of claim 1 wherein:
the movable mechanical portions of the machine tool consisting of: the lambda motor, theta motor, lambda shaft, connecting arm, build surface, and all intervening movable mechanical elements are free of linear motion elements.

20. The machine tool of claim 1 wherein:
the machine tool is an additive-material manufacturing tool adapted to build the removably affixed part; and
wherein the machine tool head provides additive material used to manufacture the part.

21. The machine tool of claim 1 wherein:
the tool head axis is fixed relative to the reference plane.

22. A method of manufacturing a part comprising the steps:
(a) providing a machine tool, wherein the machine tool comprises:
  a lambda rotary motor comprising a lambda shaft and an associated lambda axis collinear with the lambda shaft;
  a theta rotary motor comprising a theta shaft and an associated theta axis collinear with the theta shaft;
  a build surface at a predetermined distance from a fixed reference plane;
  a baseplate comprising an opening through which the lambda shaft passes;
  a machine tool head having a tool head axis;
  a connection arm affixed at a proximal end to the theta shaft and affixed at a distal end to the lambda motor;
  wherein the lambda and theta axes are parallel and offset;
  wherein the reference plane is normal to the lambda and theta axes;
  wherein the reference plane is at a predetermined distance from the baseplate;
  wherein the lambda motor is disposed on a first side of the base plate and the build surface is disposed on a second side of the base plate;
  wherein the build surface is adapted to removably affix the part;
  wherein the tool head axis passes through the machine tool head, is normal to the reference plane and is fixed relative to the theta axis;
  wherein the lambda shaft is configured to rotate the build surface around the lambda axis;
  wherein rotation of the theta shaft is configured to revolve the lambda motor, the lambda axis, and the build surface in an arc around the theta axis; and
  wherein the rotations of the lambda and theta shafts are configured to move the build surface such that any desired point on the build surface is intersected by the tool head axis;
(b) providing a controller configured to receive data that defines a shape of the part and configured to control the machine tool based on the received data;
(c) controlling the machine tool such that it manufactures the part via additive manufacturing or subtractive manufacturing.

* * * * *